Feb. 24, 1925.

H. P. KELLY

TRIMMING MACHINE

Filed March 10, 1924   2 Sheets-Sheet 1

1,527,194

INVENTOR.
Herbert P. Kelly
Edward C. Taylor
BY
ATTORNEY.

Feb. 24, 1925.  
H. P. KELLY  
1,527,194  
TRIMMING MACHINE  
Filed March 10, 1924  
2 Sheets-Sheet 2
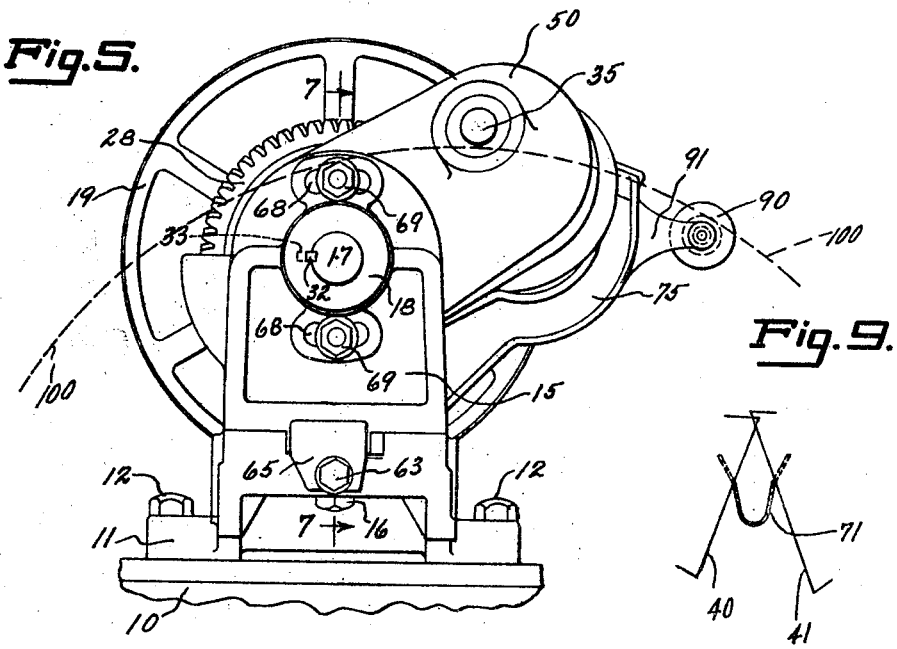
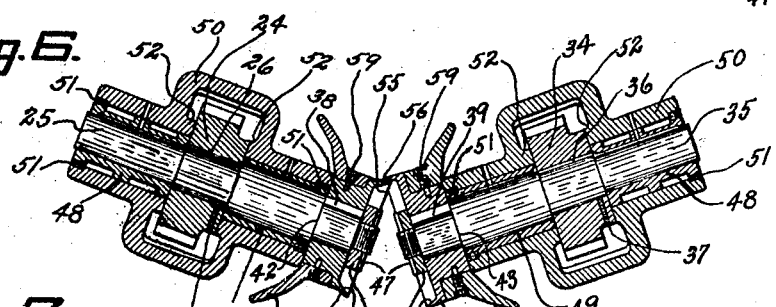
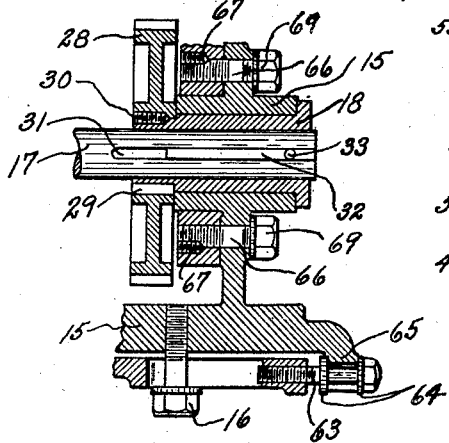
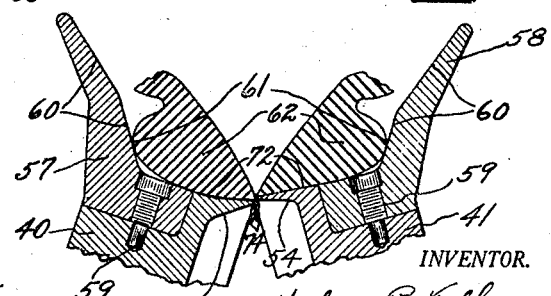
INVENTOR.  
Herbert P. Kelly  
BY  
Edward C. Taylor  
ATTORNEY.

Patented Feb. 24, 1925.

1,527,194

UNITED STATES PATENT OFFICE.

HERBERT P. KELLY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TRIMMING MACHINE.

Application filed March 10, 1924. Serial No. 698,329.

*To all whom it may concern:*

Be it known that I, HERBERT P. KELLY, a citizen of the United States of America, residing at Springfield, in the county of Hampden and State of Massachusetts, have invented certain new and useful Improvements in a Trimming Machine, of which the following is a specification.

This invention relates to a machine for trimming the lower inside edges of tire casings. During the manufacture and molding of a tire there occurs a fin or ragged edge at the base or point of the bead, the trimming of which is one of the last steps in preparing the tire for the market.

A preferred embodiment of the invention is illustrated in the accompanying drawings, in which—

Fig. 5 is an end elevation of the trimming machine;

Fig. 6 is a sectional view illustrating in detail the driving and supporting mechanism of the cutters;

Fig. 7 is a section taken on line 7—7 of Fig. 5;

Fig. 8 is a partial sectional view of the trimming cutters showing the position of the tire beads when they are trimmed; and Fig. 9 is a section taken on line 9—9 of Fig. 2.

Figure 1:
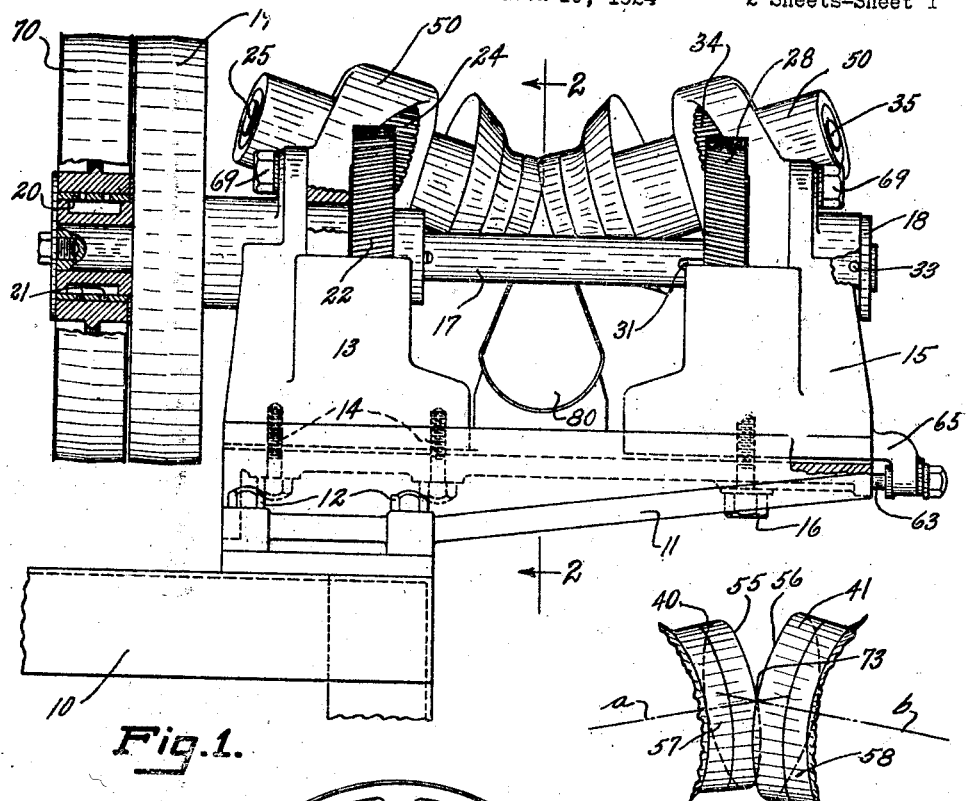
Fig. 1 represents a front elevation showing my improved trimming machine with certain parts broken away.

The trimming machine is carried on a table 10 or other suitable support. The base 11 of the machine is secured near the edge by bolts 12 and overhangs the edge of the table 10. On the rear of the base 11 is fastened a fixed bracket 13 by bolts 14, while on the front of the base is a slidable bracket 15 held in operating position by a bolt 16. The main drive shaft 17 of the machine is mounted in the fixed bracket 13 and in a sleeve 18 which rotates in the slidable bracket 15. The drive shaft 17 is preferably driven by a pulley 19 or may be driven by any other suitable means. On the hub of the driven pulley 19 is pressed a sleeve 20 having a number of holes 21 in it for the purpose of allowing a lubricating liquid in the recess to lubricate the outside bearing surface of the sleeve on which an idler pulley 70 rotates.

A helical gear 22, keyed to the drive shaft by a key 23, drives a helical gear 24, keyed on a short shaft 25 by a key 26 and held against lateral movement by a set screw 27. A helical gear 28 is mounted on and fastened to the slidable sleeve 18 by a key 29 and a screw 30. Sliding in a keyway 31 of the main drive shaft is a key 32 with an upset portion 33 which fits in an opening in the slidable sleeve. The helical gear 28 drives a helical gear 34 keyed on a short shaft 35 by a key 36 and held against lateral movement by the set screw 37. Keyed to the short shafts by keys 38 and 39 are cup-shaped trimming cutters 40 and 41, which are held against shoulders 42 and 43 of the shafts by nuts 45 and 46. The nuts 45 and 46 are slotted at 47 for a spanner wrench, and are threaded right and left hand according to the direction of rotation so that they will not turn off due to the rotation of the shafts.

Bearings 48 and 49 are pressed into housings 50, being held in fixed positions by set screws 51, and are of different inside diameters so as to permit easy assembling of the gears 26 and 34 on the short shafts. The gears are of such a width as to permit a running fit between bosses 52 in the housing 50.

Figures 2, 3, 4:
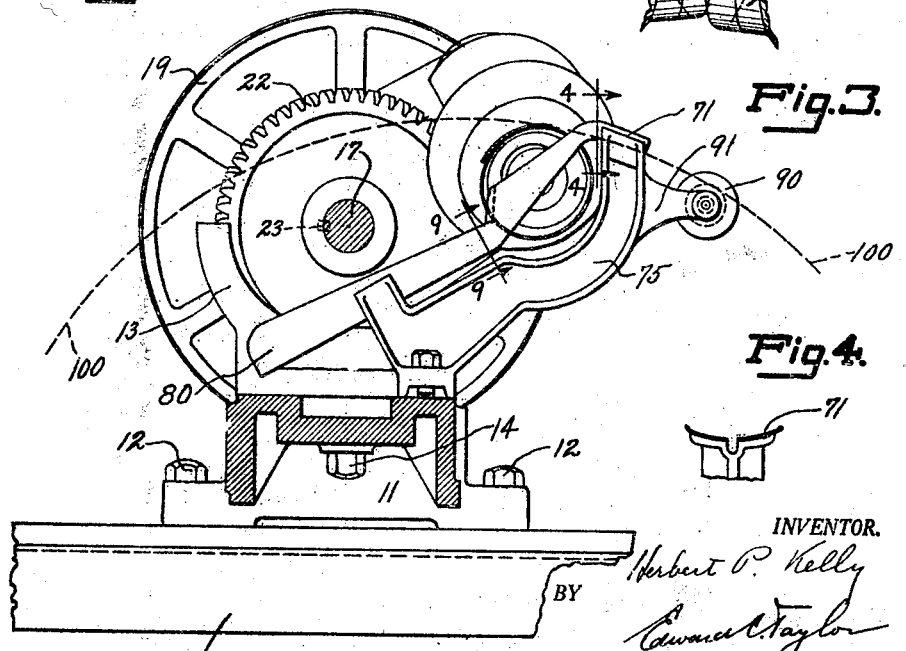
Fig. 2 is a section taken on line 2—2 of Fig. 1.
Fig. 3 is a partial plan view showing the relation of the cutters to each other.
Fig. 4 is a section of a guiding means taken on line 4—4 of Fig. 2.

Cup-shaped portions 53 and 54 of the cutters 40 and 41 overlap each other to form a V-shaped opening (see Figs. 3 and 6), and edges 55 and 56 are sharpened so as to sever the fin or ragged edge of the tire bead by a shearing action. The cup-shaped cutter 40 is preferably smaller in diameter than the cutter 41, and positioned close enough to cutter 41 to permit rotation of the cutters and trim the beads of the tire. The housings carrying the shafts 25 and 35 are so designed that the shafts are tipped down at an angle with the horizontal plane and also tipped back from the vertical (Figs. 1, 3, and 6). In this manner the cup-shaped cutters are positioned to form the V-shaped opening into which the fin at the base of the bead is guided when the cutters are in operation.

On the cutters 40 and 41 are mounted circular guides 57 and 58, held in position by set screws 59. Slanting sides 60 of the guides are adapted to contact with heels 61 of beads 62 and insure registration of the fin or ragged edge with the cutting edges 55 and 56.

In order to maintain a close engagement between cutting edges 55 and 56, the sleeve 18 to which the gear 28 is secured is slidably mounted on the main shaft by the previously described spline or feather key 32 having a turned portion 33 fitting in the sleeve to hold the key in place. The bracket 15 is slidably mounted on the base 11 and can be moved inwardly and outwardly by a screw 63 mounted in the base and having collars 64 on either side of a forked member 65 to press against the member when the screw 63 is rotated to bring the cutter 41 in proper cutting relation with cutter 40. In housings 50 are studs 66 fixed by screws 67 which pass through slotted openings 68 (Fig. 5) in brackets 13 and 15, the housings being held in adjusted position by nuts 69. By loosening the nuts 69 the housings may be swung to raise or lower the cutters so as to bring them into a cutting position with the outer surface of cutter 40 tangent to the inner surface of cutter 41, similar to one shown in Figs. 3, 6, and 8 where the preferred point of cutting is directly above the apparent point of intersection of the center lines $a$ and $b$ as viewed in Fig. 3. The center lines do not actually intersect, owing to the difference in diameters of the cutters, but this terminology is useful for convenience.

It will be noted that this trimming device is capable of continuous operation without requiring the operator to give his attention to duties other than the placing of the tire so the beads are on the guides 57 and 58, whereon it hangs until it is removed after the completion of a single revolution of the beads 62 over the cutters. The cutters having been adjusted to accurately center and trim the beads, the machine is set in motion by shifting the belt from the idler pulley 70 over to the driving pulley 19. A tire (as represented by dotted line 100, Fig. 2) is placed or hung over guide 71 which is mounted on bracket 75, rotating guides 57 and 58, and cutters 40 and 41 which conform to the heels 61 and bottoms 72 of the beads 62. The slanting sides 60 of the rotating guides press against the heels 61 of the beads 62 to guide the toes of the beads down and bring them together so that the bottoms of the beads rest on the cutters and guides (see Fig. 8). The tire is rotated by its frictional contact with the cutters and guides the toes of the bead pinched together by the guides as they pass the point of trimming 73 (Fig. 3), and the fins or ragged edges 74 (Fig. 8) are fed into the bit of the cutters and severed from the beads. It is the weight of the tire, the drawing down action of the rotating guides, together with the angularity of the guides that causes the fins or ragged edges to take the positions shown in Fig. 8.

The guide 71 is shaped so as (Fig. 9) to scrape off any of the trimmings that may stick to the cutters. The guide 71 flares out at the bottom 80 (Fig. 1) and acts as a chute to catch and carry the trimmings away as they fall from the cutters. Guide 71 may be extended, or a roll 90 or series of rolls supported by an arm 91 of a guide support 75 (Fig. 2), conforming to the shape of the beads, so as to give greater support to the tire and prevent any tendency of swinging that the tire may have.

This trimming machine is also constructed so that the cutters may be sharpened without the necessity of removing them from their shafts. A small grinding wheel may be mounted on the base of the machine, driven from the main shaft by a belt in V-grooved pulleys and adapted to swing into position and sharpen the cutters, thus decreasing the time necessary to grind the cutters and thereby increasing the efficiency of the machine. Liquids, such as water, may be applied to the cutting edges 55 and 56 by means of a wick to aid the cutting or trimming of the beads, or the liquids can be arranged under each cutter so the cutting edges 55 and 56 will pass through the liquid.

Having thus described my invention, I claim:

1. A method of trimming the fin or ragged edge at the base or point of the beads of a tire casing, in which the points of the beads are brought into a position touching each other and held in such position while the fins or ragged edges are simultaeously severed from the casing by a single cutting action.

2. A machine for trimming tire casings comprising means for trimming said tires, means to support the tire casing so that the bases or points of the beads are pinched against one another, and driving mechanism to effect travel between the casing and trimming means.

3. A device for trimming the bead edges of tire casings constructed and arranged to provide a guiding space sufficient in width to receive both beads of a tire and decreasing in cross-sectional area as the cutting point is approached, and to present a cutting edge at substantially the center of the guiding space in position to trim simultaneously the edges of the two beads so guided.

4. In a machine for trimming tire casings, a pair of interfitting cup-shaped cutters for trimming the fin at the base or point of the beads, and means for guiding and positioning the beads so that the bead points are pinched against one another and are trimmed simultaneously by the cutters.

5. A machine for trimming tire casings comprising a pair of interfitting cup-shaped cutters, means to support the tire casing so that the bases or points of the beads are pinched against one another, and driving mechanism to effect travel between the casings and cutters.

6. In a machine for trimming tire casings, a pair of rotary cup-shaped cutters adapted to trim the inner edges of the casing, a pair of guides mounted on said cutters to contact with the outer surface of the beads to press and hold the lower edges of the beads in cutting relation to the cutters, and means for rotating said cutters and guides to advance the tire casing.

7. A device for trimming the bead edges of tire casings having a cutter, and flanged roller guides with the axes of the rollers inclined to each other so that the roller flanges form a progressively acting pressure means for forcing both bead edges of a tire into contact with each other with their tips in the path of the cutter.

8. A cutting device including a pair of rotatable cup-shaped cutters arranged with their axes inclined to each other, one cutter telescoping within the other so as to present a shearing action at their common point of tangency.

9. A cutting device including a pair of rotatable cup-shaped cutters adjustable towards and from each other and arranged with their axes inclined to each other, one cutter telescoping within the other so as to present a shearing action at their common point of tangency, the adjustment serving to shift the point of tangency and thus change the point of cutting.

10. A tire trimming device adapted to trim the bead edges of a tire, including a pair of cup-shaped cutters arranged with their axes inclined to each other, one cutter telescoping within the other so as to present a shearing action at their common point of tangency, the cutters being adjustable towards and from each other and also adjustable rotatively about axes concentric to their individual axes of rotation, both these adjustments serving to shift the common point of tangency.

11. A machine for trimming the bead edges of tire casings including a pair of cup-shaped cutters carrying concentric flanges, the cutters being arranged with their axes inclined to each other and with one cutter telescoping within the other and tangent to it so as to present a shearing action at the common point of tangency, and the flanges forming together a progressively acting guide for pressing together the two beads of a tire so as to present the two bead edges simultaneously to the action of the cutter.

12. A machine for trimming tire casings, a pair of rotatable cup-shaped cutters adapted to trim the lower edges of the casings, a pair of flanged guides mounted on said cutters, means for rotating said cutters and guides, comprising a main shaft, a pair of helical gears driven by said main shaft, helical gears on said main shaft driving a pair of helical gears mounted on separate shafts, said separate shafts carrying the cutters and guiding means, and means for rotating the main shaft.

13. In a machine for trimming tire casings, cup-shaped cutters and means for holding and directing the lower edges of a tire casing to said cutter, comprising a fixed guide, rotatable flanged guides mounted on said cutters, the flanged guides and said cutters being adapted to contact the outer lower surface of the casing, the opening between the flanged guides corresponding substantially to the shape of the outer surface of the casing, the point of tangency and point of cutting on said cutters being located at the small end of the opening between the flanged guides, and means for rotating said cutters and flanged guides to advance the tire casing.

HERBERT P. KELLY.